July 26, 1960 F. A. WILLIAMS 2,946,133
MEDITATION DEVICE
Filed July 20, 1959
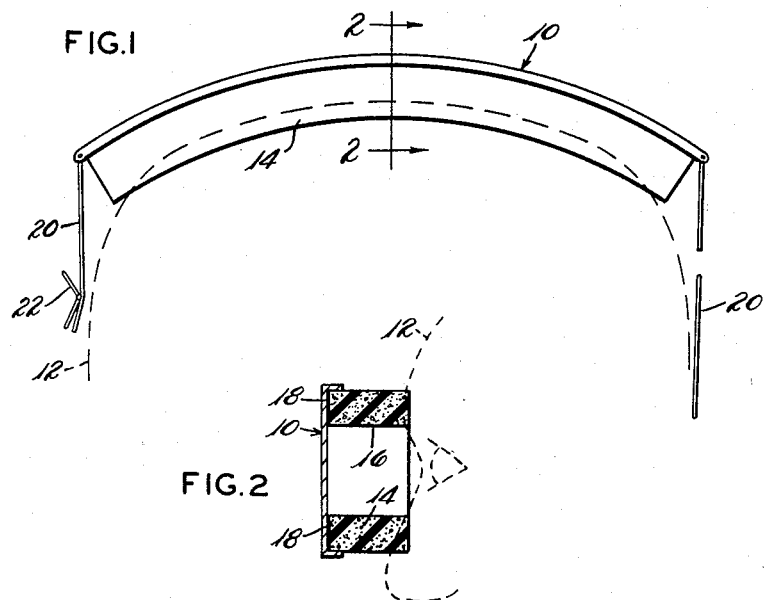
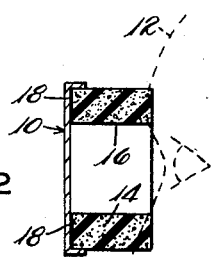
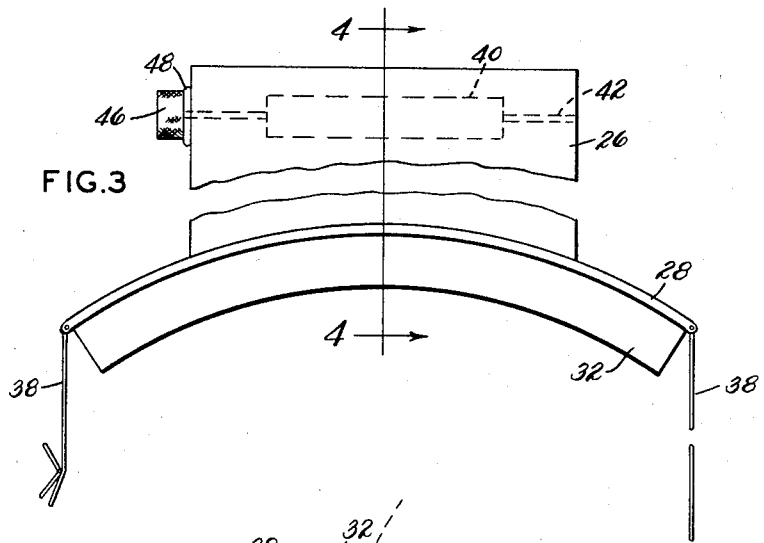
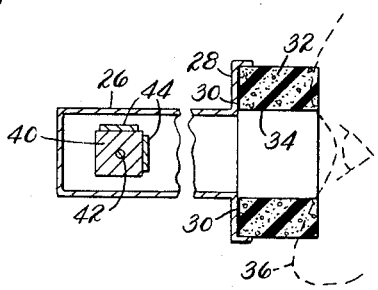
INVENTOR.
FRED A. WILLIAMS
BY
Oldham & Oldham
ATTYS.

United States Patent Office 2,946,133
Patented July 26, 1960

2,946,133
MEDITATION DEVICE
Fred A. Williams, 476 S. Firestone Blvd., Akron, Ohio Filed July 20, 1959, Ser. No. 828,256

3 Claims. (Cl. 35—23)

This invention relates to a device for facilitating meditation by a human being, and, more particularly, it is concerned with a unit which can be attached over the eyes of a human being to shut off all extraneous light thereby facilitating contemplative meditation.

It is the general object of my invention to provide relatively simple, inexpensive, durable, and readily applied means for shutting off all outside light from a human being's eyes whereby meditation can be aided and abetted.

Another object of my invention is to provide a member of the type described which is comfortable in use, and which can be constructed to provide total darkness, or which can selectively provide images or symbols for assisting in meditation.

The foregoing objects of my invention, and other objects which will become apparent as the description proceeds, are achieved by the provision of a member for facilitating human meditation comprising a body having a portion contoured to fit over a human being's eyes and the bridge of the nose, an endless element of resilient material having a hollow center and secured to the contoured portion and conforming therewith and adapted to effect a light-tight seal against a human being's forehead, temples, cheekbone, and nose around the entire periphery of the contoured portion, strap means for securing the body over a human being's eyes but one of engagement therewith, said body portion being closed so that a human being wearing the member has all extraneous light cut off from his eyes thereby abetting contemplative meditation.

For a better understanding of the invention reference should be had to the accompanying drawings wherein Fig. 1 is a plan view of a member incorporating the principles of the invention;

Fig. 2 is a vertical cross-sectional view taken on line 2—2 of Fig. 1;

Fig. 3 is a plan view similar to Fig. 1, but of a modification of the invention; and Fig. 4 is a vertical cross-sectional view taken on line 4—4 of Fig. 3.

In the drawings, the numeral 10 indicates a body of sheet metal, molded plastic, or other suitable material contoured to or having a portion contoured to fit over a human being's eyes, the forehead portion of a human being being very diagrammatically shown by a chain dotted line bearing numeral 12. An endless element 14 of resilient material, such as foam or sponge rubber, plastics, or the like, having a hollow center 16 to, in effect, make the element 14 endless is adhesively secured or otherwise fastened, as at 18, to the body 10 so that the resilient element 14 will surround the human's eyes and effect a light-tight seal against a human being's forehead, temples, cheekbones and nose around the entire periphery of the contoured portion of the body 10, these portions of the human again being indicated in Fig. 2 by the chain dotted line 12.

The body 10 and resilient element 14 are adapted to be secured in the position indicated on the human being, and this may be accomplished by means of flexible and/or resilient strap means 20 including buckle 22 secured to the ends of the body 10, the strap 20 being fastened around the head of the human being in a manner which will be evident.

The body 10 is closed in the manner best seen in Fig. 2 so that all extraneous light is shut off from the eyes of the human being wearing the device thereby abetting meditation. For purposes of simplification, Figs. 1 and 2 of the drawings show the resilient element 14 undeformed by contact with the forehead, nose, etc., of the human being whose face contours have been indicated in these figures by the chain dotted line 12, but it will be understood that in actual use of the member that the resilient element 14 will be deformed as it contacts the face contours 12 of the wearer of the member so that the very light-tight seal described will be effected.

Coming now to the modification of the invention shown in Figs. 3 and 4, a hollow box-like body 26 is provided with a contoured cup-like portion 28 adapted to fit around the eyes of a human being, these portions of the member being made from sheet metal, plastic, or other suitable materials, substantially to the form illustrated. Secured by any suitable means, such as adhesive 30 to the contoured portion 28 is an endless element 32 of resilient material having a hollow center 34 and adapted to fit around the eyes of a human being whose face contour is partially indicated by the chain dotted line 36. The resilient material 32 is of any suitable foam or sponge rubber, plastic, and the like.

Suitable strap or like means 38 are secured to the contoured portion 28 to facilitate securing the member to a position over the eyes of a human being.

The modification of the invention of Figs. 3 and 4 is particularly characterized by having a block 40 pivotally mounted on pins 42 in the closed body 26, the block 40 having a plurality of sides, with a picture or symbols 44 mounted or painted on certain of the sides. Other side or sides of the block 40 are left blank. The pictures or symbols 44 are made preferably from a luminous or phosphorescent paint so that if the pictures or symbols 44 are turned toward the opening 34 and left out in the sunlight or other bright light for a period of time when the meditation member is not being used they will glow for a considerable period of time after the light is cut off.

Thus it is possible in the form of the invention shown in Figs. 3 and 4 to position a picture or symbol 44 so that when a human being wears the meditation member that the picture or symbol can be seen in absolute darkness with all extraneous light cut off. Or, alternatively, in this form of the invention as well, it is possible to turn the block 40 so that a blank side thereof will be presented towards the eyes of the human being using the member so that nothing but darkness can be seen. It is possible to extend the pin 42 at one end of the block through the body 26 and fasten it to a knob 46 with a resilient interposed washer 48 of felt or foam plastic between the knob 46 and the side of the body 26 so that it is possible to change the position of the block 40 while the member is being worn, all without allowing any light to filter into the inside of the body which is closed.

For purposes of simplification the resilient element 32 has not been shown in the drawing as distorted by contact with the face lines 36 of a human being wearing the meditation member, but it will be understood that in the actual use of the member that the resilient element 32 will distort and conform to the surface contours of the human being's face to effect a light-tight seal therewith.

While a certain representative embodiment and details have been shown for the purpose of illustrating the invention, it will be apparent to those skilled in this art that various changes and modifications may be made therein without departing from the spirit or scope of the invention.

What is claimed is:

1. A member for facilitating human meditation comprising a body having a portion contoured to fit over a human being's eyes and bridge of the nose, an endless element of resilient material and having a hollow center secured to the contoured portion and conforming therewith and adapted to effect a light-tight seal against a human being's forehead, temples, cheekbones and nose around the entire periphery of the contoured portion, strap means for securing the body over a human being's eyes but out of engagement therewith, rotatable picture forming means in the body and viewable by the human being's eyes, means outside the body for rotating the picture forming means, said body being closed so that a human being wearing the member is in a condition of having all extraneous light excluded thereby abetting contemplative meditation.

2. A member for facilitating human meditation comprising a body having a portion contoured to fit over a human being's eyes and bridge of the nose, an endless element of resilient material and having a hollow center secured to the contoured portion and conforming therewith and adapted to effect a light-tight seal against a human being's forehead, temples, cheekbones and nose around the entire periphery of the contoured portion, strap means for securing the body over a human being's eyes but out of engagement therewith, said body having a box-like shape extending outwardly from the contoured portion, a block rotatively mounted in the body, light-absorbing phosphorescent images on only certain sides of the block, means outside the body for changing the rotative position of the block inside the body, said body, contoured portion, and endless element forming a light-tight enclosure over the eyes of the human being wearing the member whereby meditation in total darkness with or without the images viewable is achieved.

3. A member for facilitating human meditation comprising a body having a portion contoured to fit over a human being's eyes and bridge of the nose, an endless element of resilient material and having a hollow center secured to the contoured portion and conforming therewith and adapted to effect a light-tight seal against a human being's forehead, temples, cheekbones and nose around the entire periphery of the contoured portion, strap means for securing the body over a human being's eyes but out of engagement therewith, said body having a box-like shape extending outwardly from the contoured portion, means rotatively mounted in the body, light-absorbing phosphorescent images on only certain sides of said means, said body, contoured portion, and endless element forming a light-tight enclosure over the eyes of the human being wearing the member whereby meditation in total darkness with or without the images viewable is achieved.

References Cited in the file of this patent

UNITED STATES PATENTS

| 2,125,871 | Austin | Aug. 9, 1938 |
| 2,305,080 | Hemphill et al. | Dec. 15, 1942 |
| 2,342,840 | Cadous | Feb. 29, 1944 |

FOREIGN PATENTS

| 1,103,684 | France | May 25, 1955 |